United States Patent
Kumar et al.

(10) Patent No.: US 9,875,740 B1
(45) Date of Patent: Jan. 23, 2018

(54) USING VOICE INFORMATION TO INFLUENCE IMPORTANCE OF SEARCH RESULT CATEGORIES

(71) Applicant: A9.com, Inc., Palo Alto, CA (US)

(72) Inventors: Mukul Raj Kumar, Mountain View, CA (US); Balpreet Singh Pankaj, Santa Clara, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 15/187,251

(22) Filed: Jun. 20, 2016

(51) Int. Cl.
| | | |
|---|---|---|
| *G10L 15/22* | (2006.01) | |
| *G10L 25/54* | (2013.01) | |
| *G06F 17/30* | (2006.01) | |
| *G10L 15/30* | (2013.01) | |
| *G10L 15/10* | (2006.01) | |
| *G10L 25/51* | (2013.01) | |
| *G10L 25/78* | (2013.01) | |

(52) U.S. Cl.
CPC .............. *G10L 15/30* (2013.01); *G10L 15/10* (2013.01); *G10L 25/51* (2013.01); *G06F 17/30395* (2013.01); *G10L 25/54* (2013.01); *G10L 2015/225* (2013.01); *G10L 2025/783* (2013.01)

(58) Field of Classification Search
CPC ..... G10L 15/08; G10L 15/1815; G10L 15/19; G10L 2015/221; G10L 2015/225; G10L 25/54; G10L 15/22; G06F 17/30395
USPC .......... 704/251, 257, 270; 707/728, 766, 768
See application file for complete search history.

(56) References Cited

U.S. PATENT DOCUMENTS

| | | | |
|---|---|---|---|
| 8,417,530 B1 * | 4/2013 | Hayes ..................... | G10L 15/26 704/1 |
| 8,630,860 B1 * | 1/2014 | Zhang ............... | G06F 17/30026 704/235 |
| 9,047,857 B1 * | 6/2015 | Barton .................... | G10L 15/22 |
| 9,401,144 B1 * | 7/2016 | Garber .................... | G06F 3/167 |
| 2002/0169754 A1 * | 11/2002 | Mao .................... | G06F 17/3069 |
| 2007/0219994 A1 * | 9/2007 | Lemelson ......... | G06F 17/30864 |
| 2007/0266025 A1 * | 11/2007 | Wagner ............ | G06F 17/30867 |
| 2009/0193003 A1 * | 7/2009 | Heymans .......... | G06F 17/30427 |
| 2009/0228277 A1 * | 9/2009 | Bonforte ................ | G10L 15/26 704/246 |
| 2009/0312658 A1 * | 12/2009 | Thieberger ......... | A63B 24/0062 600/520 |
| 2010/0161328 A1 * | 6/2010 | Krumel ................... | G10L 15/30 704/236 |

(Continued)

OTHER PUBLICATIONS

Smith, Simon Graham Jeremy. Predicting query types by prosodic analysis. Diss. University of Birmingham, Aug. 2003, pp. 1-168.*

(Continued)

*Primary Examiner* — James Wozniak
(74) *Attorney, Agent, or Firm* — Hogan Lovells US LLP

(57) ABSTRACT

Approaches provide for using voice information to influence the importance of search result categories for a search query. For example, various embodiments may provide search results for a search query based on a most relevant search result category to the search query. Voice information associated with a subsequent user interaction may be analyzed to identify whether the search result category is correct or if search results from a different category should be provided. Additionally, the voice information may be used to update the relevance score of the search result category to the search query to improve the category matching of future queries.

20 Claims, 8 Drawing Sheets

(56) References Cited

U.S. PATENT DOCUMENTS

| | | | | |
|---|---|---|---|---|
| 2012/0047151 A1* | 2/2012 | Leggetter | ......... | G06F 17/30646 707/749 |
| 2012/0072217 A1* | 3/2012 | Bangalore | ........... | G10L 15/1807 704/243 |
| 2012/0264095 A1* | 10/2012 | Yu | .......................... | G09B 19/00 434/236 |
| 2014/0214813 A1* | 7/2014 | Braham | ............ | G06F 17/30867 707/723 |
| 2014/0229175 A1* | 8/2014 | Fischer | .................. | G10L 15/22 704/235 |
| 2015/0317320 A1* | 11/2015 | Miller | ................ | G06F 17/3053 707/728 |
| 2016/0055184 A1* | 2/2016 | Fokoue-Nkoutche | ......................... | G06F 17/30339 707/809 |
| 2016/0188670 A1* | 6/2016 | Ruvini | ............... | G06Q 30/0623 707/732 |
| 2016/0379638 A1* | 12/2016 | Basye | ............... | G06F 17/30764 704/235 |
| 2017/0018272 A1* | 1/2017 | Lee | ..................... | G10L 15/1815 |

OTHER PUBLICATIONS

Teevan, Jaime, et al. "Information re-retrieval: repeat queries in Yahoo's logs." Proceedings of the 30th annual international ACM SIGIR conference on Research and development in information retrieval. ACM, Jul. 2007, pp. 1-8.*

Whittle, Martin, et al. "Data mining of search engine logs." Journal of the American Society for Information Science and Technology 58.14, Sep. 2007, pp. 2382-2400.*

* cited by examiner

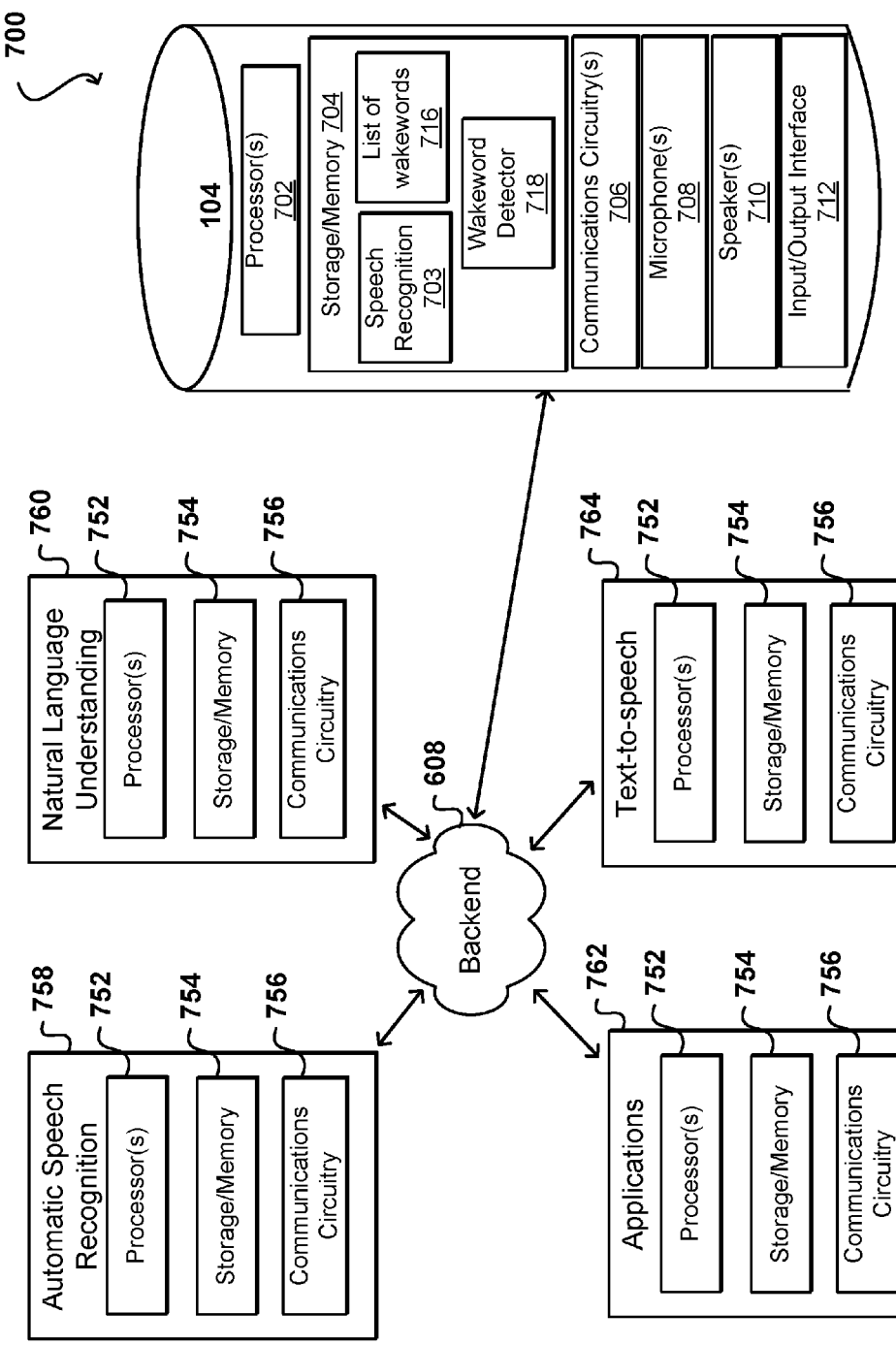

USING VOICE INFORMATION TO INFLUENCE IMPORTANCE OF SEARCH RESULT CATEGORIES

BACKGROUND

As electronic devices become increasingly sophisticated, people are using such devices in new and interesting ways. For example, some devices have adopted voice control where the device can perform various actions in response to a spoken question or instruction. In response to the question or instruction, these devices can provide information, music, audiobooks, news, weather, traffic, sports, control connected devices, etc.

However, it can be difficult to present the correct information for a search request due to the limitations of the interface between a user and the voice-controlled device. For example, such devices may not have a display or may have smaller displays and it may be time consuming for a user to review a large list of search results. Users can easily get frustrated and give up on a search request. Accordingly, there is a need to improve the interaction between users and voice controlled devices as well as a need to better identify what information a user is interested in based on a search query.

BRIEF DESCRIPTION OF THE DRAWINGS

Various embodiments in accordance with the present disclosure will be described with reference to the drawings, in which:

FIG. 7 illustrates an example for sending electronic communications between electronic devices.

DETAILED DESCRIPTION

Figure 1A:
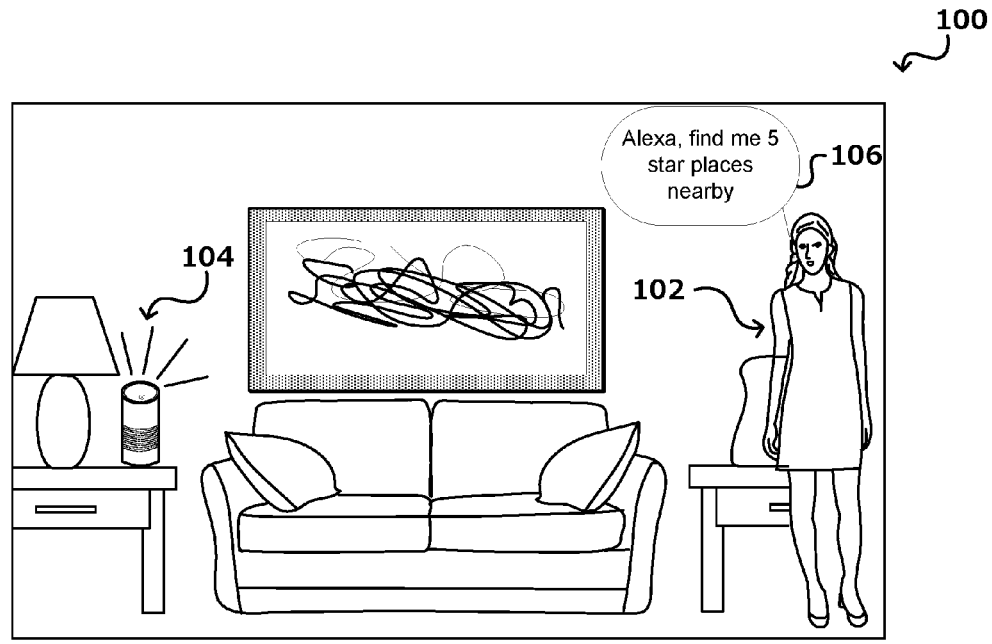
FIGS. 1A, 1B, 1C, and 1D illustrate an example environment and example interactions between a user and a voice-enabled device where results from an incorrect results category have been provided in which aspects of the various embodiments can be utilized.

Systems and methods in accordance with various embodiments of the present disclosure may overcome one or more of the aforementioned and other deficiencies experienced in conventional approaches to performing voice searching with electronic devices. In particular, various approaches use voice information to influence the importance of search result categories in response to a search query.

Traditional search interfaces provide search results based on the most relevant matching entries to a search query. For example, for a search query related to "5 star places," a search provider system may match the search query to results related to hotels, restaurants, and service providers (e.g., "5 star" tire store). Traditional search results would be provided in order of similarity to the content associated with the different entities within their related websites, reviews, and/or other stored information related to each of the entities that may be based on a search algorithm of the service provider. For example, the list of search results may include 5 hotels, 3 service providers, and 5 restaurants. The results may be provided in order of relevance to the search query which may include the presentation of 2 restaurants, 1 service provider, and 2 hotels in a first set of search results. If the user is not interested in any of those results, the search service may provide the next 5 results ranked by relevance or similarity to the search query. However, the user is likely only interested in one type of search result and the user may get frustrated or lose interest where a search interface is limited in the amount of information that can be provided at a single time. For example, in a voice-enabled digital assistant environment, the user may have to wait a long period of time for the digital assistant to read out all of the search results before reaching the entities or subject matter the user is actually interested in (e.g., given a list of 100 matching results including restaurants, hotels, and service providers, the service may try the top 3 first, if the user does not like those results, the service may try the next 3 on the list, and so on).

In embodiments of the present invention, search results can be classified into various categories (e.g., restaurants, convenience stores, service providers, etc.,) which can be used to organize the types of search results provided in response to a search query. In environments with a limited ability to provide a large amount of search results to a user, a search service provider may provide a limited number of results to a user. For instance, voice-enabled assistants (e.g., Amazon™ Echo™, Amazon™ Alexa™, etc.) may only provide a few results before the user becomes frustrated or loses interest in the results. As such, for searches that match multiple different types of categories of content, it can be difficult to know which category of results a user is interested in. For example, some search queries may be broad or vague and search results may match to multiple different types of categories. However, many users do not have the patience to wait for a long list of different types of search results to be provided through the limited interface (e.g., to be read back to the user by the voice-enabled digital assistant). Accordingly, by extracting categories from the matching search results and selecting results from the most relevant category for a search query, a small set of relevant results may be provided to a user.

However, the selected category may not capture the area of interest of the user. As such, the voice information associated with a subsequent user interaction may be used to identify whether the category is correct or if results from a different category should be provided to the user. Accordingly, a user may provide voice feedback regarding the provided results that can be used to provide more relevant results to the user. Additionally, the voice feedback may be used to improve the category matching similar queries in the future. For instance, in the context of a particular search session, if a user repeats a query in a raised voiced, the voice information implies that the broad categories of search results provided are incorrect and the search results returned to the user should change to emphasize a different search category.

Moreover, the subsequent user interaction may provide the system positive and/or negative feedback regarding whether the selected category was correct for the search query. As such, the system can track and upgrade relevance scores associated with each of the category to search query mappings and can improve the accuracy and efficiency of the search provider system based on user feedback. Accordingly, by using voice information from interactions with the user, a database of category to search query mappings may be improved over time to provide better search results in response to other search queries in the future.

Embodiments provide a variety of advantages. For example, by providing better category matching to search queries over time, the system can better match future search queries with particular categories that are shown to be most relevant to user search queries over a large number of users over time. Accordingly, fewer interactions are necessary for finding the relevant results the user is interested in. As such, fewer resources of the computing system are necessary to find a subject of interest associated with a search query. Additionally, embodiments provide improvements to user interfaces where the ability to provide a large amount of information is limited. For example, embodiments may be used to improve user interfaces for a voice-enabled computing device that reads search results to a user or a watch with a very small display that can only provide a small number of results to a user at a time. As such, embodiments improve the ability for a system to provide a smaller number of results to a user based on a search query and still provide relevant information to a user.

Various other functions and advantages are described and suggested below in accordance with the various embodiments.

FIG. 1A illustrates an example environment 100 where a user 102 is interacting with a voice-enabled communications device 104. A voice-enable communications device includes, for example, any device having a microphone or other component configured to generate audio data from sound in the frequency range in which humans communicate. As will be described further herein, voice-enabled communications devices include devices that utilize a wakeword or other predetermined sound profile to activate some functionality (e.g., send data to a remote device, such as audio input data for speech analysis) as well as button-activated devices that utilize a button (graphical, physical, or both) to enable some audio-related functionality (e.g., a sound-capturing and sending mode). In this example, user 102 can speak a request within an environment where the voice-enabled communications device 104 is located. The request may be any question, inquiry, instruction, phrase, or other set of one or more words/sounds. For example, the user may say, "Alexa, find me 5 star places nearby." In this example, the word "Alexa" has a special connotation, in that it may be referred to as a wakeword, or activation word (the wakeword would be a different word, or a particular phoneme or a particular sound, such as the sound made by clapping or snapping your fingers). In particular, a wakeword may be detected within audio input data detected by one or more microphones located on the voice-enabled communications device. Persons of ordinary skill in the art will recognize, however, that the one or more microphones may alternatively be located on a separate device in communication with the voice-enabled communications device. In some embodiments, after the wakeword is detected, the voice-enabled communications device may begin interpreting and analyzing audio input data until no more speech is detected.

In general, the voice-enabled communications device 104 constantly listens for the wakeword and is otherwise inactive. Once the wakeword is recognized, the voice-enabled communications device switches from a passive mode to an active mode. It should be noted that the wakeword does not have to be the first word or sound in a given sentence or request. The voice-enabled communications device can be configured such that it can record and store a limited amount of audio input data that should, in most instances, is the amount of time needed to speak a sentence or more. Accordingly, even if a wakeword is recognized in the middle or end of a sentence, the voice-enabled communications device will have retained the entire sentence which can then be analyzed by backend servers to determine what is being requested.

An application executing on the voice-enabled communications device or otherwise in communication with the voice-enabled communications device, can analyze the user's speech that includes audio input data 106 to perform at least one function. The functions can include, for example, performing a search for content matching a user's search query, sending an electronic message (e.g., a text message or a voice message) initiating a phone call, answering questions, playing music, reading audiobooks, controlling connected devices via voice commands/instructions, among other such functions. In this example, the user 102 is providing a search query to the voice-enabled communications device in order to find one or more places of interest to the user. In some embodiments, the search results may be read back to the user by the voice-enabled communications device or may be transmitted to a registered computing device (not shown) associated with the user 102. For example, a text message can be sent with the search results to the user. It should be noted that the other types of messages can be provided to the user's computing device as well, which may include voice messages, video messages, for example.

The voice-enabled communications device can be associated with a customer account provided by a service provider. The customer account can include one or more profiles, e.g., one or more family member profiles or other profiles, where each profile can be associated with a telephone number, preferences, access rights, and other information, and may share certain account settings as may include payment information (same credit card), address, message allotment, etc. In the situation where one of the members desires to find one or more entities of interest (e.g., a service provider, a location, a type of subject matter, or any other information related to content that may be stored within a database), the member can activate the voice-enabled communications device, for example, using a wakeword, announce who they are, and then speak the search query. Announcing who they are can cause the device to load the appropriate member profile and corresponding preferences, access rights, and contacts authority. In various embodiments, rather than have a member announce who they are, the voice-enabled communications device can automatically determine the member speaking using speech analysis software. For example, an application executing on the voice-enabled communications device or otherwise in communication with the device can analyze the speaker's voice to determine an identity of the speaker and associated profile. Based on the identity of the speaker, the appropriate member profile and corresponding preferences, access rights, and contracts authority can be used. It should be noted that other approaches can be implemented to login to a particular profile. For example, each profile may be logged into by, for example, saying the wakeword then a special keyword/phrase (e.g., sign in as Jane) and/or by biometrics (i.e., speaker identification based on sound of voice and, if camera is available, facial recognition or, if fingerprint scanner, fingerprint ID), among other such approaches.

In this example, the customer account can be associated with a user profile associated with user 102. The service provider can provide an internet-based voice service as well as other services. The voice service can receive and can analyze audio input data using speech recognition software and/or other audio analysis software to determine an action to perform based on the received audio input data. In this example, the user 102 is attempting to search for local service providers and/or subject matter. To initiate the search, the user 102 has spoken an instruction to "find me 5 star places nearby" which informs the voice-enabled communications device as to the subject matter they are searching for (e.g., 5 star places), a geographic limitation (e.g., "nearby"), and a person to provide the results to (e.g., "me").

For example, in response to the user 102 speaking the phrase "Alexa, find me 5 star places nearby," audio input data 106 that includes the phrase is received at the voice-enabled communications device 104 and an application executing on the voice-enabled communications device or otherwise in communication with the voice-enabled communications device can analyze the audio input data 106. For example, the contents of the audio input data may be streamed to a backend server (see FIG. 7 for further explanation) such that at least a portion of the audio input data can be received by the backend server and analysis can begin on that portion and any subsequent portions immediately upon receipt. In particular, the backend server can begin processing one or more portions of the audio input data prior to the user having completed making the instructions. Thus, the backend server can start analyzing whatever portion of the audio input data it received through a variety of techniques such as automatic speech recognition (ASR) and natural language understanding (NLU) to convert the audio input data into a series of identifiable words, and then to analyze those words in order to interpret the meaning of the request from the user. The backend server can utilize ASR techniques to recognize the spoken words that were recorded and stored in the MP3 data and to translate them into known text that can then be analyzed by NLU techniques to attempt to decipher the meaning of the request from user. Any suitable computer implemented speech-to-text technique may be used to convert the received audio signal(s) into text, such as SOFTSOUND speech processing technologies available from the Autonomy Corporation, which is headquartered in Cambridge, England, United Kingdom. In some embodiments, one or more filters may be applied to the received audio input data to reduce or minimize extraneous noise, however this is not required. In this example, analyzing the audio input data 106 can include determining a search query "5 star places nearby," an intended recipient "me," and an instruction "find," to identify the search query and provide search results in response to the search query. The backend server can then perform a search based on the search query, obtain search results, and provide the most relevant search results to the user. Note that in some embodiments, the search results may be read back to the user through the voice-enabled communications device or may be provided to a user's computing device. It should be noted that although a person is illustrated as initiating the search query, any sending entity (i.e., any person, electronic device, internet-based service, etc.) can initiate the search query. Further, as would be understood to one skilled in the art, the audio input data can be analyzed for any one of a number of different functions, wherein submitting a search query is just one of those functions.

Figure 1B:
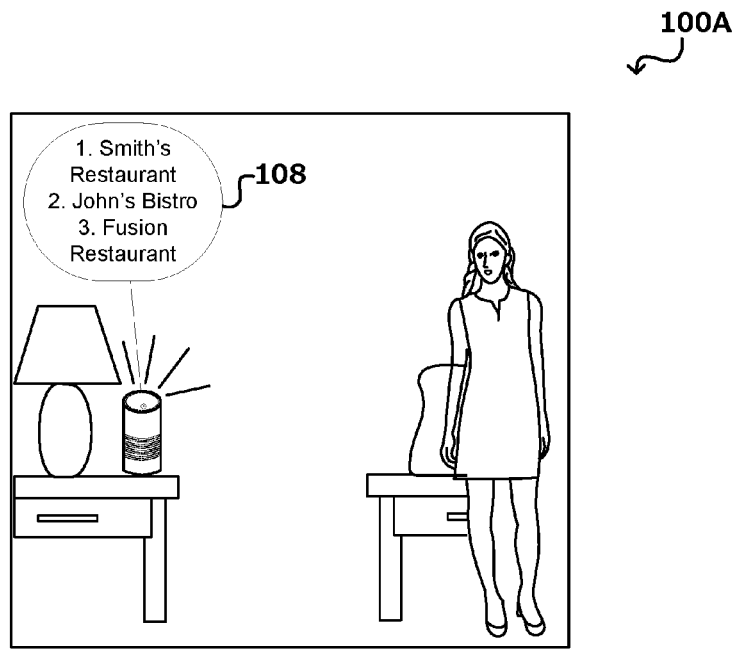

As shown in the example environment 100B focusing on the user and the voice-enabled communication device of FIG. 1B, the voice-enabled communications device 104 can receive a first set of search results associated with the search query "5 star places nearby" and provide the first set of search results 108 to the user. Because the voice-enabled communications device shown in FIG. 1B does not have a large display for providing a large number of search results to a user, a large set of matched search results obtained by the backend server computer that performs the search may be limited to a smaller set of search results that can be easily provided to a user through digital voice playback. For example, the search for "5 star places nearby" may result in hundreds or thousands of search results based on a search of one or more data stores of content of the search provider. The large number of search results may contain content associated with entities across multiple different categories and/or attributes that may be used to further limit the number of results.

For example, as described above, the search query "5 star places nearby" when searching a corpus of content may return search results matching restaurants, hotels, service providers (e.g., auto repair shops), museums, theatres, and/or any other relevant entities that either have names, ratings, or subject matter associated with "5 star places" and that are located within a predetermined distance from the geographic location of the user. However, the service provider may know based on other past requests which categories are most likely to match with the search query. Accordingly, instead of providing a mixed list of search results based on individual entry similarity to the search query, categories may be extracted from the matching search results and may be compared to a database of category to search query importance relevance to determine which category of search results is most likely related to the search query. For example, as shown in FIG. 1B, the voice-enabled communications device provides 3 of the most similar search results related to restaurants. As such, the restaurant category may be the most relevant category associated with the search query "5 star places" or "5 star places nearby" within the category to search query importance data store. As such, the voice-enabled communications device responds with the search results including the highest ranked search results within the "restaurant" category by reading to the user "1. Smith's restaurant, 2. John's Bistro, and 3. Fusion Bistro."

Figure 1C:
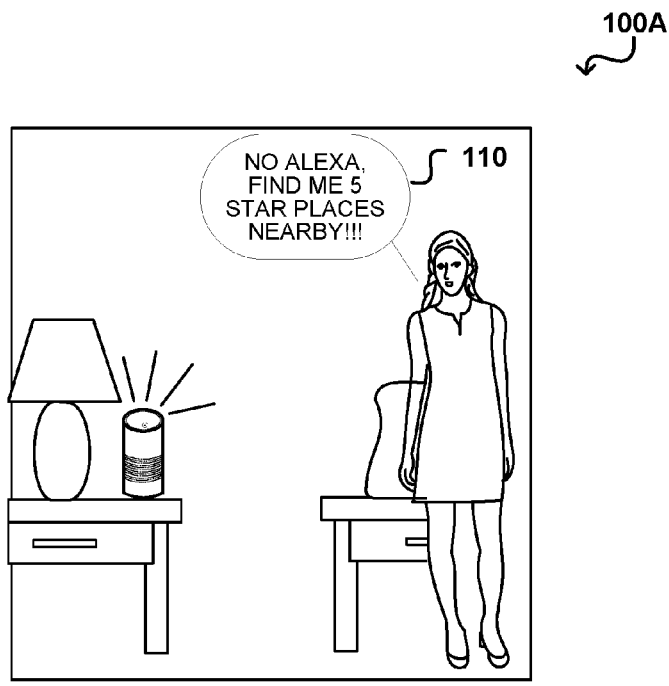

However, the user may not be interested in restaurants and may be looking for 5 star hotels. Accordingly, the user may get frustrated with the result set and may provide a raised voice utterance associated with second audio input data 110 to indicate to the voice-enabled communications device that the results of the search are not accurate. The user may repeat their previous search query or may provide a similar search query (e.g., "find me the highest rated locations nearby!"). Accordingly, as shown in FIG. 1C, the second audio input data may include a user yelling "NO ALEXA, FIND ME 5 STAR PLACES NEARBY!!!" Accordingly, the voice-enabled communications device may stop providing search results associated with the first search query and may determine the instruction associated with the second audio input data. The voice-enabled communications device may perform similar steps to identify the type of instruction and may send the second audio input request to the search service for a second search query to be performed.

Figure 1D:
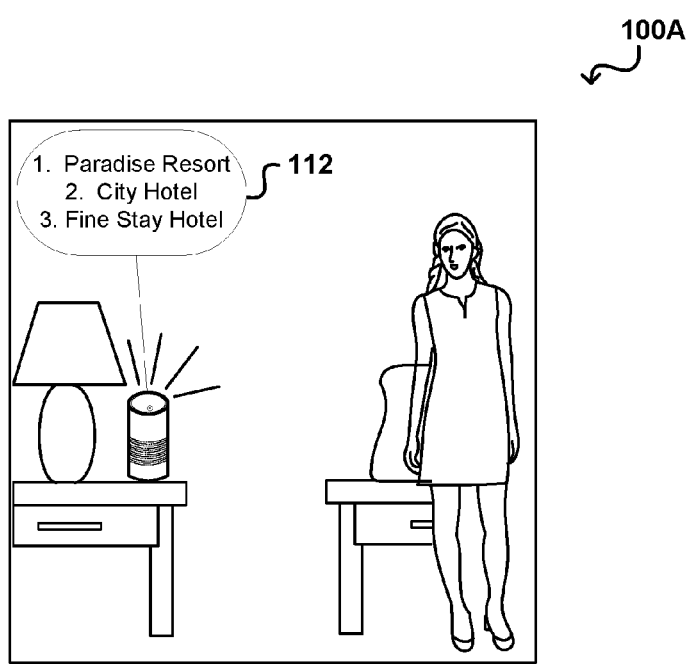

The search service may analyze the second audio input data to identify a difference in the volume of the audio input related to the first search query and the second search query to determine that the user's voice has raised a sufficient amount to show frustration with the search results. Additionally and/or alternatively, the search service may identify whether the second audio input data includes a similar search query to the first search query, such that the user is not requesting a completely different search. If the user's voice has been raised or the search query is similar enough to the previous search query to indicate that the user is frustrated and unhappy with the previous category of search results, the search service may change to another category of search results since the user is indicating they are unhappy with the search result category provided by the first set of results. The search service may use the previously determined original search results to identify a second set of search results associated with a second category (e.g., hotels) having a second highest category relevance score to the search query "5 star places" to provide more relevant search results to the user. For example, as shown in FIG. 1D, the voice-enabled communications device may read out a second set of search results 112 (e.g., "1. Paradise Resort, 2. City Hotel, and 3. Fine Stay Hotel") related to the second category (e.g., hotels).

Accordingly, the search service has received negative feedback from the user indicating that the previously matched highest relevance search category is not appropriate for their search query. Thus, the search service may decrease the relevance score and/or the rank of the first category (e.g., restaurants) to the search query (e.g., 5 star places). Thus, when the next search query related to "5 star places" is received from a user, the search service may perform another ranking of categories related to the search query based on the relevance scores and a different category may be selected as the most relevant. The amount of decrease of the relevance scores of each category may be small or large depending on the number of requests and amount of feedback related to each of the search queries stored within the system. However, over time based on a large number of search queries and feedback responses from users over time, the system can learn which categories are preferred by users over others and can better match queries to categories of search results.

Figure 2A:
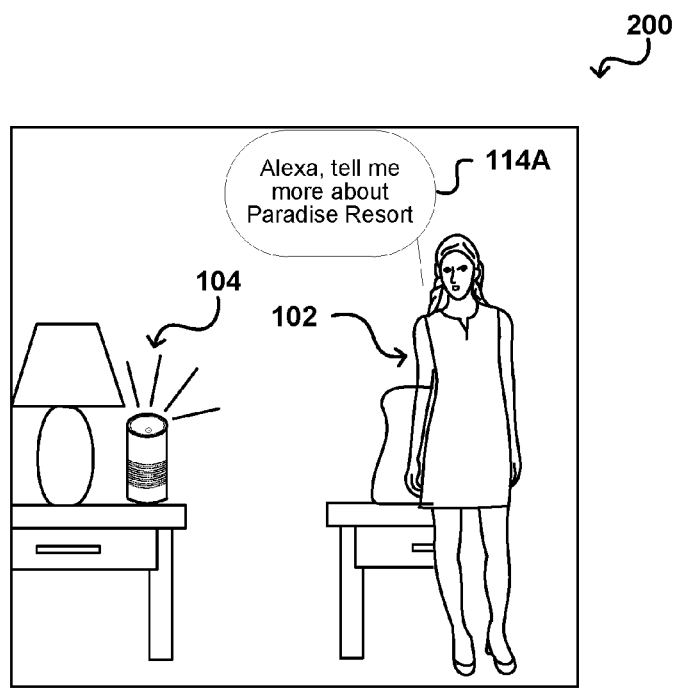
FIGS. 2A and 2B illustrate example interactions between a user and a voice-enabled computing device where results from a correct results category have been provided in accordance with various embodiments.

Moreover, the user may also provide audio input data that provides positive or neutral feedback which may be used to increase relevance scores of a category for a particular search query. For example, as shown in FIG. 2A, a user may provide audio input data 114A that asks a further question about one of the search results provided by the voice-enabled communications device. For instance, the user may provide an instruction including "Alexa, tell me more about Paradise Resort" which is one of the search results provided from the second category of search results. The search service may receive the audio input data, analyze the audio input data to identify a third search query "tell me more about paradise resort." The search service may determine that the voice volume difference between the first audio input data and the third audio input data is a decrease in volume indicating that the user is no longer frustrated and that the search query is not the same or similar to the second search query. Accordingly, the search service may determine that the audio input data indicates that the previously provided search results are associated with the correct category.

Figure 2B:
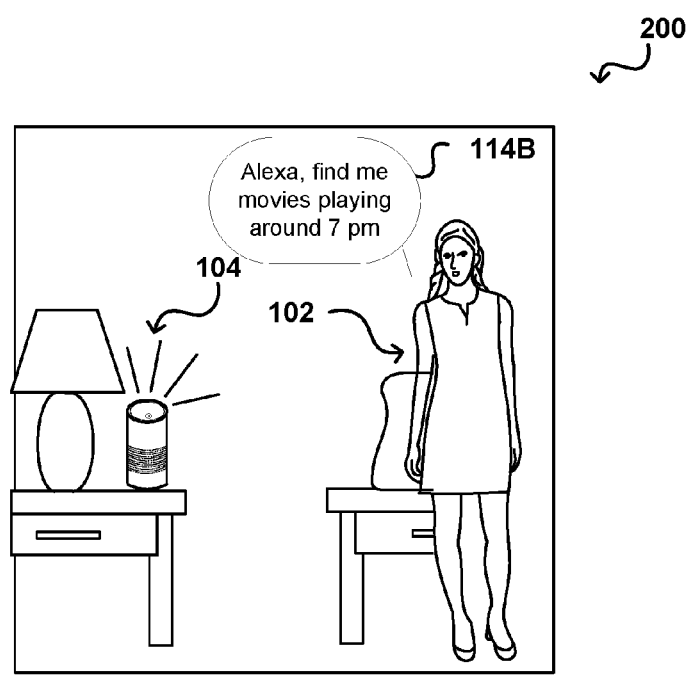

Similarly, as shown in FIG. 2B, the user may be happy with the results and completely change the subject of a search query because they have the information they desired and are asking a new question. For example, if the user was trying to remember the name of a nearby hotel and received that information in the previous set of search results (e.g., "Fine Stay Hotel"), they may change the next query to ask a different question they have. For example, the user may provide the instruction "Alex, find me movies playing around 7 pm" which is not related in any way to "5 star places nearby." Accordingly, the search service may identify the search query, determine that the voice volume difference is lower or the same as a previous question, that the search query is not similar to a previous search query, and may determine that the search result category of the previous search results was correct.

As such, there are multiple manners in which a search service may determine that the previous search category was correct. Thus, the search service may take such interactions as positive feedback for the relevance of the previously provided category for the previously received search query. In embodiments, the search service may increase the relevance score for the previously provided category associated with the search query. Accordingly, the category "hotels" may be increased for the query "5 star places" and when the query is received in the future, there is an increased chance that a search result from the category "hotels" is provided first instead of from the category "restaurants." Over time, the system incorporates the positive and negative feedback to update categories for each search query which results in the system identifying the best matching categories for each query. Accordingly, embodiments may more quickly result in the correct search results being provided to users.

Although FIGS. 1B and 1D show the voice-enabled communications device providing a first set and second set of search results by playing the search results to the user, in some embodiments, the search results may be transmitted to another computing device (not shown) that is associated with the user. For example, a computing device may include, for example, a smart phone, an electronic book reader, tablet computer notebook computers, ultrabooks, tablet computers, mobile phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-based devices, smart furniture, smart household devices, smart vehicles, smart transportation devices, and/or smart accessories, among others.

Figure 3:
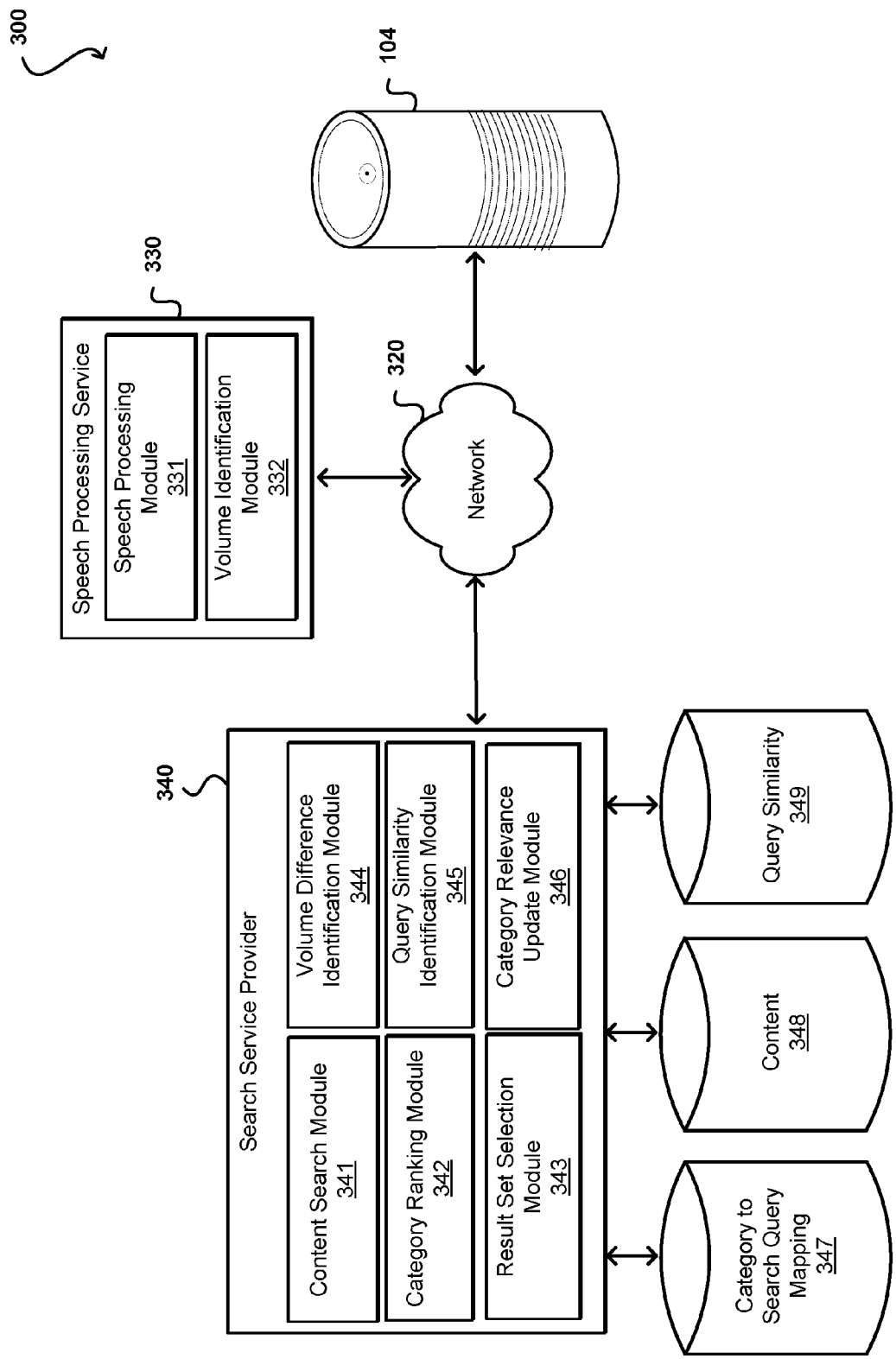
FIG. 3 illustrates a block diagram of an example system for using voice information to influence the importance of search result categories in accordance with various embodiments.

FIG. 3 illustrates a block diagram of an example system 300 for using voice information to influence the importance of search result categories in accordance with various embodiments. In this example, system 300 shows example data flows between a speech processing service 330, a search service provider 340, and a voice-enabled communications device 104 that is providing audio input data corresponding to user utterances. It should be noted that additional services, providers, and/or components can be included in such a system, and although some of the services, providers, components, etc. are illustrated as being separate entities and/or components, the illustrated arrangement is provided as an example arrangement and other arrangements as known to one skilled in the art are contemplated by the embodiments described herein. The system includes a voice-enabled communications device 104, a speech processing service 330, and a search service provider 340 (which could be provided through one of the applications servers explained in further detail in reference to FIG. 7) that communicate through a network 320.

In this example, a user may make an utterance, such as an utterance that includes a spoken command for the speech processing service 330 to perform some task, such as a request to perform a search query. The user may speak the utterance into (or in the presence of) the voice communications device 104. The voice communications device 104 can correspond to a wide variety of electronic devices. In some embodiments, the voice communications device 104 may be a computing device that includes one or more processors and a memory which may contain software applications executed by the processors. The voice communications device 104 may include or be in communication with an audio input component for accepting speech input on which to perform speech recognition, such as a microphone. The voice communications device 104 may also include or be in communication with an output component for presenting responses or other information from the speech processing service, such as a speaker. The software of the voice communications device 104 may include hardware components and/or software for establishing communications over wireless communication networks or directly with other computing devices.

The speech processing service 330 can correspond to an online service that performs speech processing operations associated with the voice-enabled communications device 104. The speech processing service 330 may include a speech processing module 331 and a volume identification module 332.

The speech processing module 331 can receive audio input data including a user utterance via network 320 from the voice-enabled communication device 104. A user may use the voice communications device 104 to submit utterances, receive information, and initiate various processes, either on the voice communications device 104 or at the speech processing module 331. For example, as described, the user can issue spoken commands to the voice communications device 104 in order to request a search query.

The speech processing module 331 may be configured to perform automatic speech recognition (ASR) on audio data regarding user utterances, natural language understanding (NLU) on transcriptions generated by the ASR processing, applying contextual rules to current NLU results based on prior interpretations and dialog acts, a natural language generation ("NLG") module that converts certain dialog acts into user-understandable communications (e.g., text that can be "read" to the user by a text-to-speech or "TTS" component), among other such processes.

The speech processing module 331 may be performed by any number of server computing devices, desktop computing devices, mainframe computers, and the like. Each individual device may implement one of the services of the speech processing module 331. In some embodiments, the speech processing module 331 can include several devices physically or logically grouped together to implement one of the modules or components of the speech processing module 331. For example, the speech processing module 331 can include various modules and components combined on a single device, multiple instances of a single module or component, etc. In one specific, non-limiting embodiment, the speech processing module 331 may include a server or group of servers configured with ASR and/or NLU processing capabilities, a server or group of servers configured with a context interpreter processing and/or text-to-speech processing, etc. In multi-device implementations, the various devices of the speech processing module 331 may communicate via an internal communication network, such as a corporate or university network configured as a local area network ("LAN") or a wide area network ("WAN"). In some cases, the devices of the speech processing module 331 may communicate over an external network, such as the Internet, or a combination of internal and external networks.

In some embodiments, the features and services provided by the speech processing module 331 may be implemented as web services consumable via a communication network. In further embodiments, the speech processing module 331 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the features of the speech processing module 331 may be integrated into the voice communications device 104 such that network connection and one or more separate computing systems are not necessary to perform the processes of the present disclosure. For example, a single voice communications device 104 may include the microphone, an ASR module, an NLU module, a context interpreter, a text-to-speech module, or some combination thereof.

As described, users may submit utterances that may include various commands, requests, and the like. A microphone may capture utterance audio and provide it (or data derived therefrom) to the speech processing module 331 of the speech processing service 330. The speech processing module 331 may generate ASR results for the utterance, such as a w-best list of transcriptions. Each transcription or portion thereof may be associated with some score, such as a confidence score or a likelihood that the transcription or portion thereof is correct. The w-best list or some other type of results may be NLU processed so that the user's intent may be determined. A w-best list of interpretations (e.g., intents) may be determined or generated by the NLU processing. The NLU results (e.g., modify individual interpretations, filter interpretations, re-score or re-rank interpretations, etc.) may be context interpreted to identify a search query from the audio input data.

The volume identification module 332 is configured to identify the volume of the audio input data. The volume identification module 332 may implement any suitable methods of identifying the voice volume level of audio input data. For example, the volume identification module 332 may receive a measurement of the voice volume level from the microphone of the voice-enabled communications device and/or may process the audio input data to obtain a voice level based on volume information within the encoded audio input data.

The search service provider 340 can correspond to an online service that provides access to content associated with a plurality of entities including points of interest (e.g., museums, theaters, city services, etc.), service providers, retailers, and/or any other organizations or providers that may be of interest to a user. In one example, the search service provider 340 can be associated with an online electronic marketplace that provides goods or services. In the example shown in FIG. 3, the search service provider 340 may include a content search module 331, a category ranking module 342, a result set selection module 343, a search query similarity identification module 345, a volume difference identification module 344, and a category relevance update module 346. The search service provider 340 may also be configured to communicate with a category to search query mapping data store 347, a content data store 348, and a query similarity database 349.

The content search module 341 may include a software module that is configured to perform a search of the content data store 348 for a search query received from the voice-enabled communications device 104. The search query may be received in the form of a search request. The search request may include any information that may helpful for performing the functionality described herein. For example, the search request may include a search query, a voice volume level, a session indicator, etc. The content search module 341 may be configured to receive a search request from the speech processing service associated with the voice-enabled communications device 104 and identify a search query. Alternatively or additionally, in some embodiments, the content search module 341 may be configured to receive audio input data in the search request from the voice-enabled communications device 104 and may perform automatic speech recognition (ASR) and/or natural language processing (NLP) to identify the search query from the audio input data. For example, the content search module 341 may call the speech processing service in order to process the audio input data.

In accordance with various embodiments, the result can be provided to the content search module 341 as a search query to initiate searching one or more databases for matching content. For example, the content search module 341 can obtain the search query from the speech processing module 331 of the search processing service 330 and may search the content data store 348 for matching or similar database entries associated with one or more words within the search query. A result set sorted by relevance to the search query may be returned from the one or more content data stores. Information about each of the search results within the result set may be returned to the content search module 341. For example, a content identifier, a category, a description, a title, an address, a type of content entry, and any other relevant information may be returned along with the search result set. The result set may include search results associated with a plurality of different categories. As such, the content search module 341 may extract the plurality of categories associated with the returned search results and provide the categories to a category ranking module 342.

The category ranking module 342 may receive the extracted categories from the result set and may request category relevance scores associated with the search query from the category to search query mapping database 347. For example, in response to a search query for "5 star places nearby," a list of 100 matching search results may be returned ranked according to relevance scores to the search query. The search results may include entities associated with categories including restaurants, hotels, service providers (e.g., "5 star plumbers," "5 star auto repair," etc.), historical locations (e.g., "5 star trail"), etc. Accordingly, the plurality of categories from the search results may be obtained and submitted to a category to search query mapping database 347 to obtain category relevance scores associated with each of the identified categories. For instance, the category ranking module 342 may search the category to search query mapping database 347 for the search query and obtain relevance scores for a plurality of categories associated with "5 star places." The relevance scores for categories including restaurants, hotels, service providers, historical locations, etc. may be obtained. The category to search query mapping database 347 may include a plurality of search queries and corresponding rankings of categories associated with each search query. The categories may be assigned manually or through computer learning algorithms that use a training set of search result entries and category to search query mappings to classify search results and search result categories to search queries. For instance, the category to search query mapping database 347 may include an entry for the search query "5 star places" and may return a set of categories ranked according to relevance scores associated with each of the rankings. For example, the category "restaurants" may have a category relevance score of "0.932" and be ranked first while the category "hotels" may have a category relevance score of "0.876" and be ranked second. Particular service providers (e.g., plumbers, auto repair, etc.), and other categories (e.g., points of interest) may each have a relevance score and may be ranked according to their relevance to the search query.

Additionally or alternatively, in some embodiments, the category ranking module 342 may identify category relevance scores for the search query before the content search module 341 performs a search of the content database 348. For instance, the category ranking module 342 may search the category to search query mapping database 347 for the highest ranked category associated with the search query "5 star places nearby" before searching the content database 348. As such, the category ranking module 342 may determine that "restaurants" is the highest ranked category for the search query and may pass the category "restaurants" to the content search module 341 to further limit the number of results that are obtained to only those associated with the category "restaurants." Accordingly, embodiments may implement the content searching and category ranking process through either obtaining the categories from the most relevant search results or may obtain the most relevant categories and then search the content database 348 for the most relevant search results associated with the most relevant categories.

Either way, a result set selection module 343 may obtain the ranked category results and the search results and may select a set of search results to provide to the user. For example, a set of search results may be limited to a predetermined number of search results so that users are not overwhelmed or lose interest in the presentation of the search results. For instance, the voice-enabled communication device may present search results by speaking or reading out the search results to the user. As such, the number of results may be limited to 3-5 results because users may not be capable of following along or may not be patient enough to wait through a long list of search results. Accordingly, the result set selection module 343 may select a first subset of the matching search results to the query based on the most relevant category and may deliver the first set of search results to the voice-enabled communications device 104 for delivery to the user. Note that the result set selection module 343 may also send a text message, tweet, or other communication to a device of the user with the first set of results and the predetermined number of results within the first set of results may change based on the configuration of how the results are configured to be provided to the user. For instance, a user may have in their profile settings the preferred method of delivering results of search queries and the result set selection module 343 may identify a phone number, email address, or other identifying address information based on the profile settings in which to use to provide the first subset of search results.

A volume difference identification module 344 may be configured to identify a voice volume difference between different audio input data received from the voice-enabled communications device 104 during a session with a user.

The volume difference identification module 344 may be configured to identify and store a volume level for each of the audio input data received from the voice-enabled communications device 104 during a session. The volume difference identification module 344 may compare the stored voice volume for first audio input data and subsequent audio input data and calculate a voice volume difference between instructions from the user. Further, in some embodiments, voice volumes may be compared across multiple stored audio inputs to see if an escalating voice volume is present throughout the session (indicating general frustration across the interaction) or if an abrupt change occurs in response to a single result set (indicating that the particular category presented is incorrect). Further, a volume of the ambient noise in the environment may be measured and provided along with the audio input data in some embodiments to identify whether the raised volume is in response to the environment and not the results being provided. Once a session has ended the voice volume levels may be stored to a profile associated with the user to be used in characterizing the behavior of the user for use in the future if the user tends to raise their voice whether they are frustrated or not. The voice volume difference across two or more audio inputs may be compared to a threshold voice volume to identify whether the user's voice has increased enough to indicate a frustrated voice. For example, a voice volume difference of 2 dB may be due to natural changes in conversational tones of users, while a voice volume difference of 10 dB may indicate a significant change in emotional levels by a user. Accordingly, the voice volume difference may be compared to a threshold voice volume level of 7 dB and any change over 7 dB may be interpreted as showing the user is frustrated and/or unhappy with the search result category being provided.

A session may be identified based on the amount of time between a response by a voice-enabled communications device 104 and an utterance by a user. For example, an amount of time between when results are provided and when the next audio input data is provided by the user may indicate whether a request is associated with the same session or a different session. For instance, the voice-enabled communications device 104 may stay awake for a predetermined amount of time (e.g., 2 minutes, 5 minutes, etc.) after providing a result set and if an utterance is not received from a user during that time, a new session may be started for the next utterance of the user. Thus, an end of the session may be determined by an amount of time between the first set of results being presented to the user of the device and the receiving of the second audio input data. Further, in some embodiments, a user may provide a voice input (e.g., saying a "sessionword") or a physical input (e.g., pressing a button) on the voice-enabled communications device 104 to end a session and/or start a new session. Thus, the indication of whether a search query is associated with a new session or a previous session may be provided with the search request that is provided to the search service provider. For example, the search data may include the search query, the voice volume level, a session identifier (and/or indicator of whether a new session or not), and any other information that the search service provider may need to process the search query and perform the functionality described herein.

A query similarity identification module 345 may be configured to identify the similarity between search queries during a session with a user. The query similarity identification module 345 may determine the similarity between two queries through any suitable method. For example, the query similarity identification module 345 may calculate a search query similarity score by comparing the first search query and the second search query. For instance, in some embodiments, the query similarity identification module 345 may search a query similarity database 349 for both the first query and the second query and determine the distance between both queries. The query similarity database 349 may store a plurality of search queries as nodes within a hierarchical data structure and may be capable of calculating a distance between two different nodes to identify similarity between the queries. The distance between the first query and the second query may be used as the search query similarity score. The search query similarity score may be compared to a stored similarity score threshold that may be tailored to identify when two search queries are so similar that they are considered a repeated query. For instance, if the distance between the two search queries is above the threshold similarity distance that indicates a repeated query, the query similarity identification module 345 may determine the second search query is a repeat of the first search query. Other methods of analyzing and comparing similarity between search queries may be used including overlap between words and the analysis of known substitutes for inconsistencies between search queries. For example, a similarity score may be provided based the percentage of overlap and a measure of how often the differences between search queries are used interchangeably based on other search queries. Accordingly, any number of different methods may be used to identify a similarity score between queries and a threshold similarity score to indicate an appropriate level of similarity between the queries to be considered repeated queries.

A category relevance update module 346 may be configured to update the relevance scores stored in the category to search query mapping database 347 based on positive or negative feedback of users in response to one or more result sets. The category relevance update module 346 may receive the results of the volume difference identification module 344 and the query similarity identification module 345 and may determine whether the user has provided positive or negative feedback regarding a result set associated with a selected category for a search query. For example, the category relevance update module 346 may increase a relevance score for a category to search query mapping associated with a particular search query and category where the category relevance update module 346 determines that the user has provided positive feedback in response to a set of results. Likewise, if the category relevance update module 346 receives an indication that the user's voice volume difference is over a voice volume threshold and/or that the user has repeated a search query in response to a set of results associated with a particular category, the category relevance update module 346 may decrease the relevance score stored for a category to search query mapping for a category associated with a search query in the category to search query mapping database 347. The amount of increase and/or decrease to the relevance score of a category in response to a particular negative or positive feedback event from a user may be limited but in the aggregate may allow the system to identify the best matching categories for a particular search query.

Figure 4:
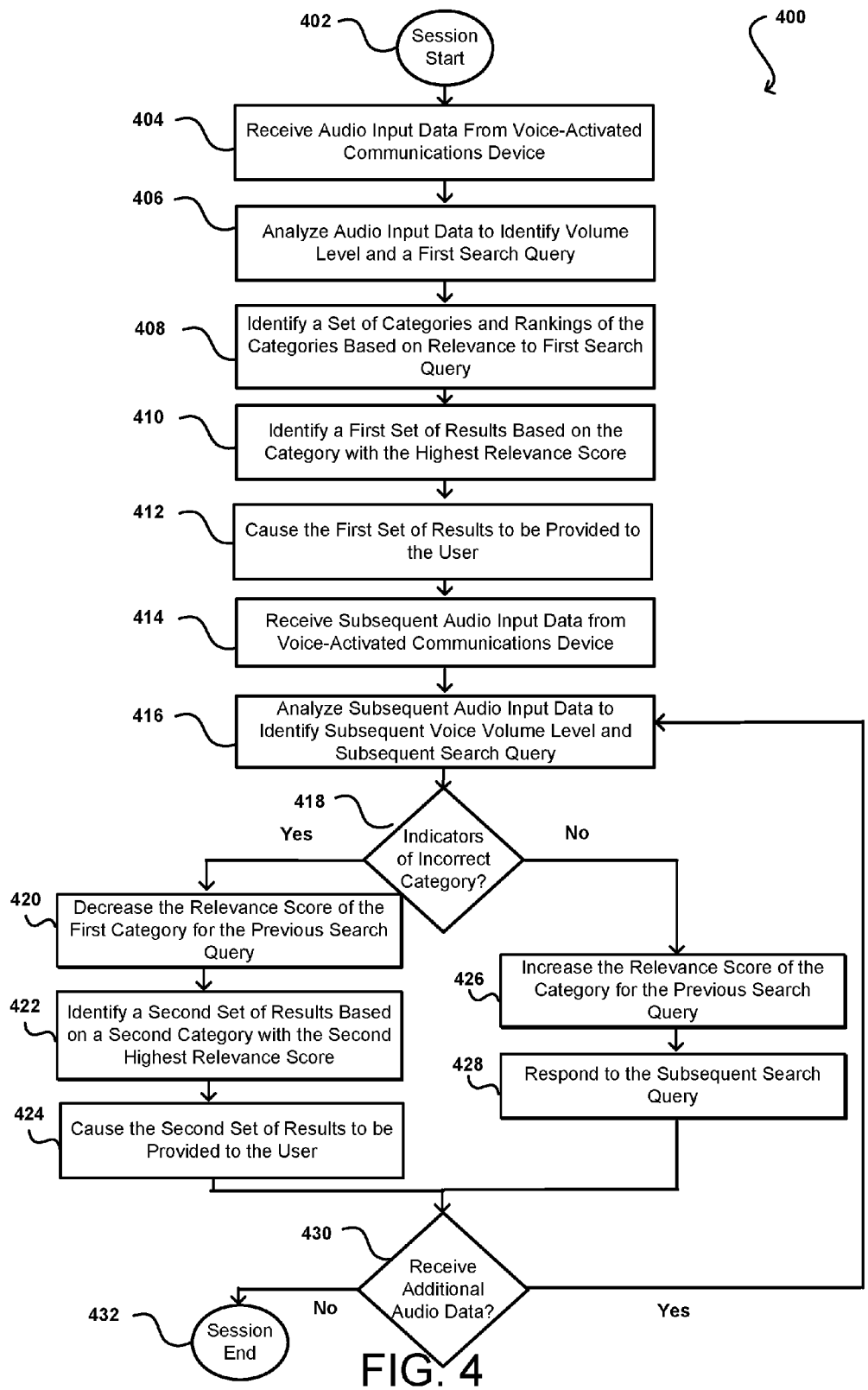
FIG. 4 illustrates an example process for using voice information to influence the importance of search result categories during a search session between a voice-enabled computing device and a user in accordance with various embodiments.

FIG. 4 illustrates an example process for using voice information to influence the importance of search result categories during a search session between a voice-enabled communications device 104 and a user in accordance with various embodiments. It should be understood that, for any process discussed herein, there can be additional, fewer, or alternative steps performed in similar or alternative orders, or in parallel, within the scope of the various embodiments unless otherwise stated.

The voice-enabled communications device 104 can include one or more microphones that can capture voice or other audio input data, wherein an application executing on the voice-enabled communications device 104 or otherwise in communication with the voice-enabled communications device 104 can analyze the data to perform a function. The functions can include, for example, performing a search query, initiating a phone call, answering questions, playing music, reading audiobooks, controlling connected devices via voice commands, among other functions. In this example, a user (e.g., someone speaking to the voice-enabled communications device 104) is attempting to obtain information related to a subject and instructs the voice-enabled communications device 104 to search a content database 348 for entries associated with a search query. A service provider can provide an internet-based speech processing service 330 and a voice search service 340 as well as other services. The speech processing service 330 can receive and can analyze audio input data using speech recognition software and/or other audio analysis software to determine an action to perform based on the received audio input data.

The process may start by a user uttering a wakeword to a voice-enabled communication device to wake up the voice-enabled communications device. A new session may be initiated 402 and the user may provide an instruction within the utterance to the voice-enabled communications device 104. The voice-enabled communications device 104 receives first audio input data by a microphone of the voice-enabled communications device. The utterance may include an instruction. The instruction may include a search query related to a topic, subject, or entity in which the user is interested in identifying or learning more about.

The speech processing service of the service provider may include a speech processing service that may receive 404 the first audio input data from the voice-enabled communications device 104. The speech processing service of the service provider may analyze 404 the first audio input to identify a first volume level and a first search query from the first audio input data. The speech processing service may identify the first search query by performing automated speech recognition on the first audio input data and may receive a first volume level from the voice-enabled communications device 104 or may measure a voice volume level from the first audio input data. The speech processing service may provide the first search query and the first volume level to a service associated with the type of instruction being provided. For example, the speech processing service may identify that a search query was provided and may identify that the search query should be directed to a search service provider associated with the service provider. Thus, in some embodiments, the speech processing service may send a search request including the search query, a voice volume level, and other indicators within the audio input data to the search service provider to facilitate the search processing. Further, in some embodiments, the voice-enabled communications device or another service of the service provider may receive the query information from the speech processing and determine that the search query (and other voice information including the voice volume level) should be provided to the search service provider in a search request.

The service provider may include an application server related to a search service provider that may receive a first search request including the first search query and the first volume level associated with the first audio input data. The search request may also include information related to whether the search request is part of a previous session and/or part of a new session between the user and the voice-enabled communications device. The search service provider may identify 408 a set of categories associated with the first search query. For example, the service provider may search a category to search query mapping database 347 for a list of categories associated with the first search query. Additionally and/or alternatively, in some embodiments, the search service may perform a search of a content database 348 for matching search results associated with the search query and may extract categories from the search results to identify relevant categories to the search results. The search provider may also determine a ranking of the categories based on relevance scores for each category to the first search query. For example, the search provider may receive the rankings of the categories according to relevance scores to the first search query from the search query mapping database along with the set of categories. Additionally and/or alternatively, the service provider may identify specific relevance scores associated with the extracted categories from the search results by requesting the relevance scores from the category to search query mapping database 347.

The service provider may identify 410 a first set of results associated with a first category of the set of categories. For example, the service provider may select the highest ranked category having the largest relevance score to the search query and may select search results from the set of search results received in response to the search of the content database 348 to obtain the first set of search results. Alternatively and/or additionally, the service provider may perform a search of the content database 348 using the category as a filtering condition to obtain search results associated with the search query and the category. The service provider may select a predetermined number of search results based on a manner in which the search results will be presented to a user. The service provider may identify the form of presentation of the search results by identifying a user profile associated with the audio input data and identifying a preferred manner in which to provide the results (e.g., playback from the voice-enabled communications device 104, text message, email, etc.). For example, the service provider may cause 412 the first set of results to be transmitted to the voice-enabled communications device 104 which may present the first set of search results to the user of the voice-enabled communications device 104.

Accordingly, the user may receive the first set of search results and may respond to the presentation of the first search results. For example, the user may provide another utterance including an instruction to the voice-enabled communication device. The voice-enabled communication device may receive second audio input data using the microphone and may transmit second audio input data to the speech processing service of the service provider. The speech processing service may receive 414 the second audio input data from the voice-enabled communications device 104. The speech processing service may analyze 416 the second audio input data to identify a second volume level of the second audio input data and a second search query. The speech processing service may determine that a search query is present and send the second search query and the second volume level to the search service provider.

The search service provider may receive the second search query and the second volume level and analyze the second audio input data to identify 418 whether indicators of an incorrect category are present in the second audio input data. There are numerous indicators of an incorrect category being present and they may be identified through a variety of manners. For example, the service provider may determine whether the user has raised their voice between audio inputs, whether the second audio input data includes a similar search query to the first audio input, whether the number of words within the first search query is significantly lower than the second search query, whether the user is revisiting an earlier question they did not get the correct answer to by re-asking a same or similar question to an earlier question that was not the immediately previous question in the session, and/or any other signs that the user is frustrated with the first category of search results provided in response to the first search query. Further explanation regarding some example methods of identifying whether indicators of an incorrect category are present in the second audio input will be described in further detail below in reference to FIG. 5.

If the service provider identifies indicators of an incorrect category of search results being provided in the previous set of search results being provided to the user, the service provider may decrease 420 the relevance score of the first category for the first search query. For example, the service provider may send a request to the category to search query mapping database 347 to decrease the associated relevance score of the first category to the first search query. The amount of change may depend on the number of search requests associated with the search query and/or may be static for each incorrect category or negative feedback response of the user identified by the system. The service provider may identify 422 a second set of results based on a second category associated with the search query. Similar methods of identifying a second category may be implemented as those described above in reference to step 408, however, the second category from the set of categories may have a second largest relevance score to the first search query. Further, the service provider may identify a second set of results associated with the second category and cause the second set of results to be provided to the user in a similar manner as described above in reference to step 410.

If the service provider does not identify indicators of an incorrect category being provided in the previous search results, the service provider may increase 426 the relevance score of the first category for the first search query. The relevance score for the category associated with the first search query may be increased in a similar manner to the decreasing described above in reference to step 420, except an increase in relevance score as opposed to a decrease in relevance score for the category to search query mapping database 347. Accordingly, the user has provided feedback indicating that the category associated with the first set of search results was correct and that the second search query is different enough from the first query that a different search should be performed with different search results associated with the second search query. Accordingly, the service provider may respond 428 to the second search query and may provide the relevant results as described herein or through any other suitable service associated with the service provider.

The service provider may wait to determine whether additional audio input data is received 430 in regards to the latest provided results of the new search query and/or the second set of search results based on the second category for a similar search query. If additional audio input data is received, the process returns to step 416 and the process is repeated until no further additional audio input data is received. However, if a predetermined period of time elapses and no additional audio input data is received, the session may be ended 432 and the voice-enabled communications device 104 may go to sleep or be deactivated.

Figure 5:
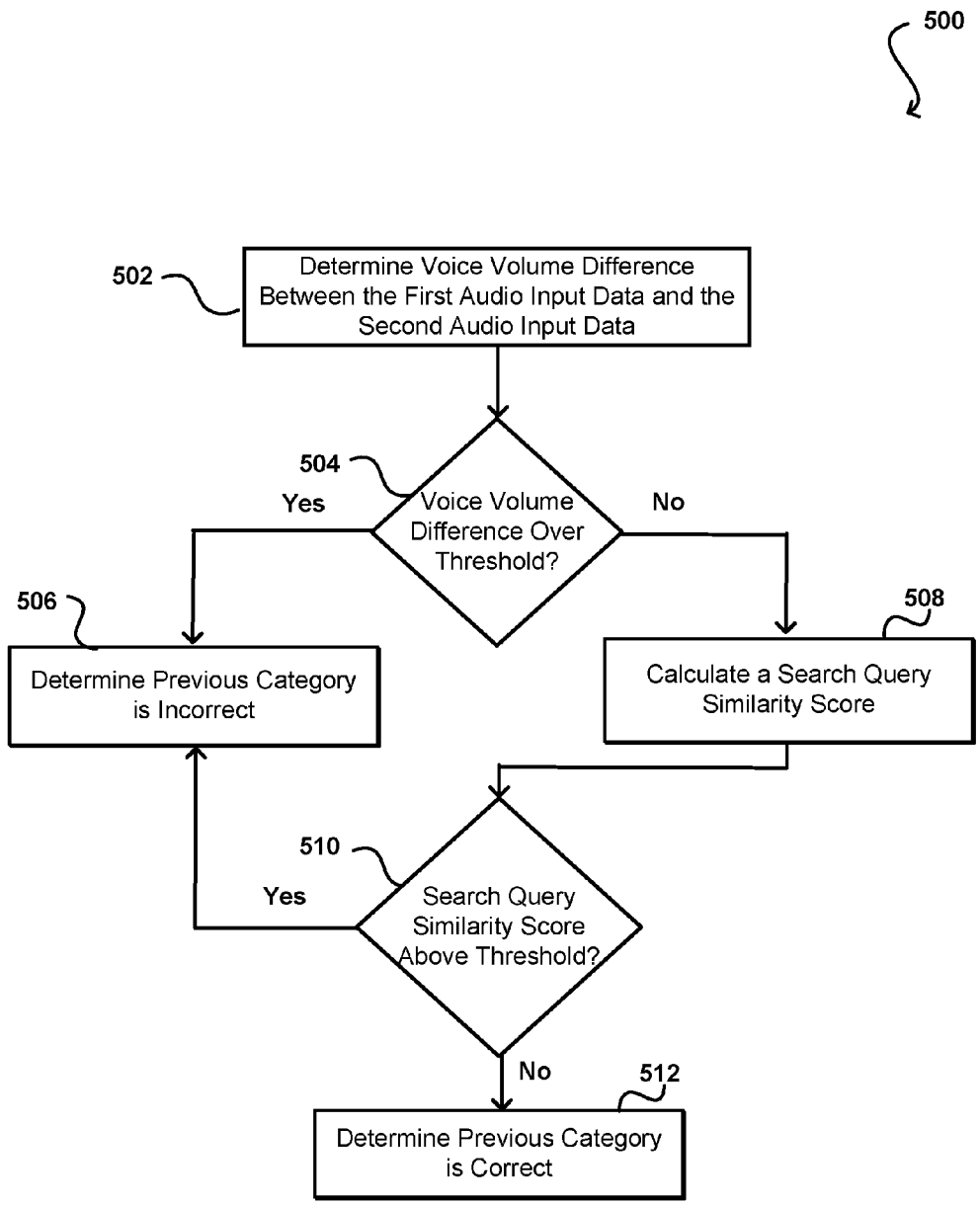
FIG. 5 illustrates an example process for identifying whether indicators of an incorrect category are present in audio input data provided by a user in accordance with various embodiments.

FIG. 5 illustrates an example process 500 for identifying whether indicators of an incorrect category are present in the second audio input data, as described above in reference to step 418 of FIG. 4. For example, in some embodiments, the service provider may calculate 502 a voice volume difference between the first audio input data and the second audio input data by comparing the first volume level and the second volume level of the respective first and second audio input data. The service provider may compare 504 the voice volume difference to a voice volume threshold. If the voice volume difference is over the voice volume threshold, the service provider may determine 506 that the previous category is incorrect because the user has raised their voice over the predetermined voice volume threshold amount that indicates frustration with search results previously provided. Accordingly, the search service provider 340 has determined that the second utterance of the user is at least a predetermined amount louder than the volume level of the first utterance.

Additionally and/or alternatively, in some embodiments, a plurality of voice volume differences may be calculated across multiple search queries/audio input data within a session between a user and the voice-enabled communications device. For example, the system may identify that the user is still speaking at a raised level from the first audio input data but that the volume level has decreased in response to the latest categories that were provided and may identify that such an interaction shows the user is not frustrated with the previous category of results that were provided. The system may characterize past user interactions to build more complex models of how sequences of voice volumes differences over interactions during a session relate to frustration of the user. Thus, in some embodiments, multiple voice volume differences between different audio input data within a session and the levels of such differences during a session should factored into determining whether a user is frustrated with the category of results that were previously provided.

However, if the voice volume difference is not over the voice volume threshold, the service provider may calculate 508 a search query similarity score between the first search query and the second search query. The service provider may compare the first search query and the second search query and calculate a search query similarity score. The search service may compare 510 the search query similarity score to a similarity score threshold to determine whether the search query similarity score is above a similarity score threshold. The similarity score threshold may be selected such that being above the threshold indicates that the second search query is a repeat search query of the first search query. If the similarity score is above the similarity score threshold, the service provider may determine 506 that the previous category is incorrect because the user has asked a similar question to the previously submitted search query. However, if the search similarity score is not above the search query similarity score threshold, the search service determines 512 the previous category is correct because a different question is being asked as the search queries are not similar.

Further, in some embodiments, the search query similarity score and the voice differences may be calculated across multiple interactions during the same session between the user and the voice-enabled communications device. For example, a search query similarity score may be calculated for each of a plurality of search queries that have been received during a session and the similarity scores between each of the search queries and the present search query may be compared to a plurality of thresholds to characterize the interaction based on past interactions with other users. For instance, a user may become frustrated and give up on a search query by asking about a completely different subject. While a search query similarity score only factored between subsequent search queries may identify this interaction as positive feedback without looking at the interaction as whole, some embodiments, may compare each of the subsequent search queries to the present search query for similarity (e.g., may identify that the user is returning to a previous question that was asked earlier in the session that the user gave up on) to identify that in fact the user was frustrated with the earlier results and may update the relevance scores accordingly. Additionally, the system may factor in other indications from the voice data (e.g., raised voice, change in pitch, etc.) to identify that in fact the user is frustrated when changing subjects of search queries.

Figure 6:
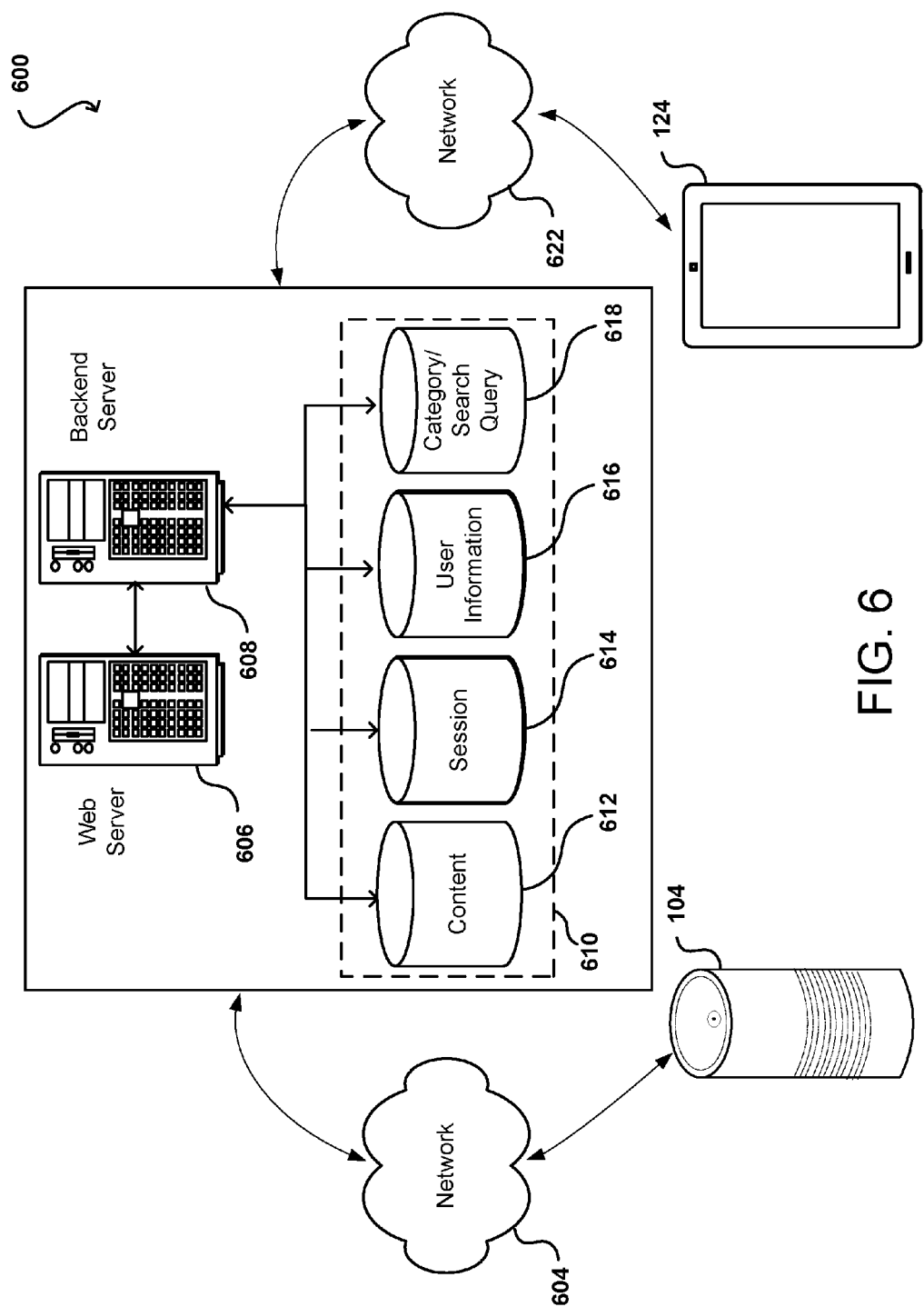
FIG. 6 illustrates an example environment in which various embodiments can be implemented.

In accordance with various embodiments, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes voice-enabled communications device 104, computing device 124, which can include any appropriate device operable to send and receive requests, messages or information over networks 604 and 622 and convey information back to an appropriate device. These devices can include, for example, notebook computers, ultrabooks, tablet computers, mobile phones, smart phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-based devices, smart furniture, smart household devices, smart vehicles, smart transportation devices, and/or smart accessories, among others. The networks can include any appropriate network, including a telephone network provided by a telecommunication operator, an intranet, the Internet, a cellular network, a local area network, wireless network, or any other such network or combination thereof. The network could be a telephone network, a "push" network, a "pull" network, or a combination thereof. Wireless networks often include communication modes such as data transfer/text messaging. Text messaging takes the known form of the short messaging service (SMS), which allows point-to-point service by sending "short" messages to and from wireless handsets. The service uses a short message service center (SMSC) to store and forward short messages. The wireless network transports messages between the SMSCs and the subscriber units. With this service, an active subscriber unit, such as a mobile handset, can receive or transmit a short message at any time, independent of whether or not a voice or data call is in progress. The system guarantees delivery of the message with failures being identified and the message stored in the network until the destination is available. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks, an alternative device serving a similar purpose could be used, as would be apparent to one of ordinary skill in the art.

The illustrative environment includes at least one backend server 608 and a data store 610. It should be understood that there can be several backend servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The backend server 608 can include any appropriate hardware and software for integrating with the data store 610 as needed to execute aspects of one or more applications for the client device and handling a majority of the data access and business logic for an application. The application server provides access control services in cooperation with the data store and is able to analyze audio date and other data as well as generate content such as text, graphics, audio and/or video to be transferred to the user, which may be served to the user by the Web server 606 in the form of HTML, XML or another appropriate structured language in this example. The handling of all requests and responses, as well as the delivery of content between the voice-enabled communications device 104 and computing device 124 and the backend server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing content (e.g., entity information) 612 and user information 616, which can be used to serve content for the production side. The data store is also shown to include a mechanism for storing log or session data 614. The data store is also shown to include a mechanism for storing category to search query mapping data 618. It should be understood that there can be other information that may need to be stored in the data store, such as page image information and access rights information, which can be stored in any of the above listed mechanisms as appropriate or in additional mechanisms in the data store 610. The data store 610 is operable, through logic associated therewith, to receive instructions from the backend server 608 and obtain, update or otherwise process data in response thereto. In one example, a user can initiate a search request associated with a search query using a voice-enabled communications device 104. In this case, the data store might access the content information to identify matching search results to the search query and may access the category to search query mapping information to identify a ranking of categories based on relevance scores to the search query. Further, the system may update the category relevance scores for one or more search queries based on feedback from user interactions based on provided search results.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The computing device 124 may include any device capable of receiving and processing input can be used in accordance with various embodiments discussed herein. These devices can include, for example, notebook computers, ultrabooks, tablet computers, mobile phones, smart phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-based devices, smart furniture, smart household devices, smart vehicles, smart transportation devices, and/or smart accessories, among others. The computing device 124 may include have a display screen 602 (e.g., an LCD element) operable to display information or image content to one or more users or viewers of the device. The display screen of some embodiments displays information to the viewers facing the display screen (e.g., on the same side of the computing device as the display screen). The computing device may include some type of display screen, such as a touch screen, electronic ink (e-ink), organic light emitting diode (OLED) or liquid crystal display (LCD), although devices such as portable media players might convey information via other means, such as through audio speakers.

The computing device in this example can include an imaging element 604 on the front of the device. It should be understood, however, that image capture elements could also, or alternatively, be placed on the sides or corners of the device, and that there can be any appropriate number of capture elements of similar or different types. The imaging element 604 may be, for example, a camera, a charge-coupled device (CCD), a motion detection sensor or an infrared sensor, or other image capturing technology. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command/instruction from a user, application, or other device.

The computing device 124 can also include at least one microphone or other audio capture elements capable of capturing audio input data, such as words spoken by a user of the device, music being hummed by a person near the device, or audio being generated by a nearby speaker or other such component, although audio elements are not required in at least some devices. In this example there microphone 606 is on the front side of the device. In some devices there may be only one microphone, while in other devices there might be at least one microphone on each side and/or corner of the device, or in other appropriate locations.

The computing device 124 in this example also includes one or more orientation- or position-determining elements operable to provide information such as a position, direction, motion, or orientation of the device. These elements can include, for example, accelerometers, inertial sensors, electronic gyroscopes, and electronic compasses. A positioning element can include or comprise a GPS or similar location-determining elements operable to determine relative coordinates for a position of the computing device 124. Positioning elements may include wireless access points, base stations, etc., that may either broadcast location information or enable triangulation of signals to determine the location of the device. An orientation determining element can also include an electronic or digital compass, which can indicate a direction (e.g., north or south) in which the device is determined to be pointing (e.g., with respect to a primary axis or other such aspect). Other positioning elements may include QR codes, barcodes, RFID tags, NFC tags, etc., that enable the computing device 124 to detect and receive location information or identifiers that enable the computing device 124 to obtain the location information (e.g., by mapping the identifiers to a corresponding location). Various embodiments can include one or more such elements in any appropriate combination.

The example device also includes at least one communication mechanism 608, such as may include at least one wired or wireless component operable to communicate with one or more electronic devices. The example computing device 124 also includes one or more networking components operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the computing device 124 can include at least one additional input device able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

FIG. 7 is another example environment 700 for implementing aspects in accordance with various embodiments. In this example, voice-enabled comunications device 104, in some embodiments, may correspond to any type of electronic device capable of being activated in response to detecting a specific sound. Voice-enabled comunications device 104 may, in some embodiments, after detecting the specific sound (e.g., a wakeword), recognize commands (e.g., audio commands, inputs) within captured audio, and may perform one or more actions in response to the received commands. Various types of electronic devices may include, but are not limited to, notebook computers, ultrabooks, tablet computers, mobile phones, smart phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-based devices, smart furniture, smart household devices, smart vehicles, smart transportation devices, and/or smart accessories, among others. In some embodiments, voice-enabled comunications device 104 may be relatively simple or basic in structure such that no mechanical input option(s) (e.g., keyboard, mouse, trackpad) or touch input(s) (e.g., touchscreen, buttons) may be provided. For example, voice-enabled comunications device 104 may be capable of receiving and outputting audio, and may include power, processing capabilities, storage/memory capabilities, and communication capabilities.

Voice-enabled comunications device 104 may include a minimal number of input mechanisms, such as a power on/off switch, however primary functionality, in one embodiment, of voice-enabled comunications device 104 may solely be through audio input and audio output. For example, voice-enabled comunications device 104 may listen for a wakeword by continually monitoring local audio. In response to the wakeword being detected, voice-enabled comunications device 104 may establish a connection with backend server 608, send audio input data to backend server 608, and await/receive a response from backend server 608. In some embodiments, however, non-voice-enabled devices may also communicate with backend server 608 (e.g., push-to-talk devices).

Voice-enabled comunications device 104 may include one or more processors 702, storage/memory 704, communications circuitry 706, one or more microphones 708 or other audio input devices (e.g., transducers), one or more speakers 710 or other audio output devices, as well as an optional visual input/output ("I/O") interface 712. However, one or more additional components may be included within voice-enabled comunications device 104, and/or one or more components may be omitted. For example, voice-enabled comunications device 104 may include a power supply or a bus connector. As another example, voice-enabled comunications device 104 may not include a visual I/O interface. Furthermore, while multiple instances of one or more components may be included within voice-enabled comunications device 104, for simplicity only one of each component has been shown.

Processor(s) 702 may include any suitable processing circuitry capable of controlling operations and functionality of voice-enabled comunications device 104, as well as facilitating communications between various components within voice-enabled comunications device 104. In some embodiments, processor(s) 702 may include a central processing unit ("CPU"), a graphic processing unit ("GPU"), one or more microprocessors, a digital signal processor, or any other type of processor, or any combination thereof. In some embodiments, the functionality of processor(s) 702 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 702 may include its own local memory, which may store program modules, program data, and/or one or more operating systems. However, processor(s) 702 may run an operating system ("OS") for voice-enabled comunications device 104, and/or one or more firmware applications, media applications, and/or applications resident thereon.

Storage/memory 704 may include one or more types of storage mediums such as any volatile or non-volatile memory, or any removable or non-removable memory implemented in any suitable manner to store data on voice-enabled comunications device 104. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 704 may be implemented as computer-readable storage media ("CRSM"), which may be any available physical media accessible by processor(s) 702 to execute one or more instructions stored within storage/memory 704. In some embodiments, one or more applications (e.g., gaming, music, video, calendars, lists, etc.) may be run by processor(s) 702, and may be stored in memory 704.

In some embodiments, storage/memory 704 may include one or more modules and/or databases, such as speech recognition module 703, list of wakewords database 716, and wakeword detection module 718. Speech recognition module 703 may, for example, include an automatic speech recognition ("ASR") component that recognizes human speech in detected audio. Speech recognition module 703 may also include a natural language understanding ("NLU") component that determines user intent based on the detected audio. Also included within speech recognition module 703 may be a text-to-speech ("TTS") component capable of converting text to speech to be outputted by speaker(s) 710, and/or a speech-to-text ("STT") component capable of converting received audio signals into text to be sent to backend server 608 for processing.

List of wakewords database 716 may be a database stored locally on voice-enabled comunications device 104 that includes a list of a current wakeword for voice-enabled comunications device 104, as well as one or more previously used, or alternative, wakewords for voice-enabled comunications device. In some embodiments, user 102 may set or program a wakeword for voice-enabled comunications device 104. The wakeword may be programmed directly on voice-enabled comunications device 104, or a wakeword or words may be set by the individual via a backend server application (app) that is in communication with backend server 608. For example, a user may use their mobile device having the backend server application running thereon to set the wakeword. The specific wakeword may then be communicated from the mobile device to backend server 608, which in turn may send/notify voice-enabled comunications device 104 of the individual's selection for the wakeword. The selected activation may then be stored in list of wakewords database 716 of storage/memory 704.

Wakeword detection module 718 may include an expression detector that analyzes an audio signal produced by microphone(s) 708 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 708. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 708. The expression detector may then compare that score to a threshold to determine whether the wakeword will be declared as having been spoken.

In some embodiments, a keyword spotter may be use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An MEW model represents a word as a series of states. Generally a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice-enabled comunications device 104 may then begin sending the audio signal to backend server 608 for detecting and responds to subsequent utterances made by user 102.

Communications circuitry 706 may include any circuitry allowing or enabling voice-enabled communications device 104 to communicate with one or more devices, servers, and/or systems. For example, communications circuitry 706 may facilitate communications between voice-enabled comunications device 104 and backend server 608. Communications circuitry 706 may use any communications protocol, such as any of the previously mentioned exemplary communications protocols. In some embodiments, voice-enabled comunications device 104 may include an antenna to facilitate wireless communications with a network using various wireless technologies (e.g., Wi-Fi, Bluetooth, radiofrequency, etc.). In yet another embodiment, voice-enabled comunications device 104 may include one or more universal serial bus ("USB") ports, one or more Ethernet or broadband ports, and/or any other type of hardwire access port so that communications circuitry 706 allows voice-enabled comunications device 104 to communicate with one or more communications networks.

Voice-enabled comunications device 104 may also include one or more microphones 708 and/or transducers. Microphone(s) 708 may be any suitable component capable of detecting audio signals. For example, microphone(s) 708 may include one or more sensors for generating electrical signals and circuitry capable of processing the generated electrical signals. In some embodiments, microphone(s) 708 may include multiple microphones capable of detecting various frequency levels. As an illustrative example, voice-enabled comunications device 104 may include multiple microphones (e.g., four, seven, ten, etc.) placed at various positions about voice-enabled comunications device 104 to monitor/capture any audio outputted in the environment where voice-enabled comunications device 104 is located. The various microphones 708 may include some microphones optimized for distant sounds, while some microphones may be optimized for sounds occurring within a close range of voice-enabled comunications device 104.

Voice-enabled comunications device 104 may further include one or more speakers 710. Speaker(s) 710 may correspond to any suitable mechanism for outputting audio signals. For example, speaker(s) 710 may include one or more speaker units, transducers, arrays of speakers, and/or arrays of transducers that may be capable of broadcasting audio signals and or audio content to a surrounding area where voice-enabled comunications device 104 may be located. In some embodiments, speaker(s) 710 may include headphones or ear buds, which may be wirelessly wired, or hard-wired, to voice-enabled comunications device 104, that may be capable of broadcasting audio.

In some embodiments, one or more microphones 708 may serve as input devices to receive audio inputs, such as speech. Voice-enabled comunications device 104, may then also include one or more speakers 710 to output audible responses. In this manner, voice-enabled comunications device 104 may function solely through speech or audio, without the use or need for any input mechanisms or displays.

In one exemplary embodiment, voice-enabled comunications device 104 includes I/O interface 712. The input portion of I/O interface 712 may correspond to any suitable mechanism for receiving inputs from a user of voice-enabled comunications device 104. For example, a camera, keyboard, mouse, joystick, or external controller may be used as an input mechanism for I/O interface 712. The output portion of I/O interface 712 may correspond to any suitable mechanism for generating outputs from voice-enabled comunications device 104. For example, one or more displays may be used as an output mechanism for I/O interface 712. As another example, one or more lights, light emitting diodes ("LEDs"), or other visual indicator(s) may be used to output signals via I/O interface 712 of voice-enabled comunications device 104. In some embodiments, one or more vibrating mechanisms or other haptic features may be included with I/O interface 712 to provide a haptic response to user 102 from voice-enabled comunications device 104. Persons of ordinary skill in the art will recognize that, in some embodiments, one or more features of I/O interface 712 may be included in a purely voice-enabled version of voice-enabled communications device 104. For example, one or more LED lights may be included on voice-enabled comunications device 104 such that, when microphone(s) 708 receive audio from user 102, the one or more LED lights become illuminated signifying that audio has been received by voice-enabled comunications device 104. In some embodiments, I/O interface 712 may include a display screen and/or touch screen, which may be any size and/or shape and may be located at any portion of voice-enabled comunications device 104. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

FIG. 7 also includes backend server 608, as mentioned previously, which may be in communication with voice-enabled comunications device 104. Backend server 608 includes various components and modules including, but not limited to, automatic speech recognition ("ASR") module 758 (which may include, for example, speech-to-text ("STT") functionality), natural language understanding ("NLU") module 760, applications module 762, and text-to-speech ("TTS") module 764. In some embodiments, backend server 608 may also include computer readable media, including, but not limited to, flash memory, random access memory ("RAM"), and/or read-only memory ("ROM"). Backend server 608 may also include various modules that store software, hardware, logic, instructions, and/or commands, such as, a speaker identification ("ID") module, a user profile module, or any other module, or any combination thereof. The speech-to-text functionality and text-to-speech functionality may be combined into a single module capable of performing both STT and TTS processing, or separate TTS and STT modules may, alternatively, be used.

ASR module 758 may be configured such that it recognizes human speech in detected audio, such as audio captured by voice-enabled comunications device 104, which is then sent to backend server 608. ASR module 758 may include, in one embodiment, one or more processor(s) 752, storage/memory 754, and communications circuitry 756. Processor(s) 752, storage/memory 754, and communications circuitry 756 may, in some embodiments, be substantially similar to processor(s) 702, storage/memory 704, and communications circuitry 706, which are described in greater detail above, and the aforementioned descriptions of the latter may apply. NLU module 760 may be configured such that it determines user intent based on the detected audio received from voice-enabled comunications device 104. NLU module 760 may include processor(s) 752, storage/memory 754, and communications circuitry 756.

Applications module 762 may, for example, correspond to various action specific applications or servers capable of processing various task specific actions. Applications module 762 may further correspond to first party applications and/or third party applications operable to perform different tasks or actions. For example, based on the context of audio received from voice-enabled comunications device 104, backend server 608 may use a certain application to perform an action, such as searching for a search query. Applications module 762 may include processor(s) 752, storage/memory 754, and communications circuitry 756. As an illustrative example, applications module 762 may correspond to a search query application. The search query application of the applications module 762 can be associated with a customer account. The customer account can be assigned a telephone number and can include at least one profile stored in, for example, user information 616 in FIG. 6 that can be linked to the search query application in applications module 762. Audio input data can be received at automatic speech recognition module 758 from voice-enabled communications device 104. The automatic speech recognition module 758 can use automatic speech recognition (ASR) techniques on the audio input data to generate text data of the audio input data. The natural language understanding module 760 can use natural language understanding (NLU) techniques on the text data to determine a search query, a recipient, and a geographic limitation. The application module may include one or more modules of the search service provider 340 of FIG. 3 and the corresponding functionality described herein.

TTS module 764 may employ various text-to-speech techniques. It should be noted that techniques for taking text and converting it into audio input data that can represent speech are well known in the art and need not be described in further detail herein, any suitable computer implemented techniques may be used. TTS module 764 may also include processor(s) 752, storage/memory 754, and communications circuitry 756.

Persons of ordinary skill in the art will recognize that although each of ASR module 758, NLU module 760, applications module 762, and TTS module 764 include instances of processor(s) 752, storage/memory 754, and communications circuitry 756, those instances of processor(s) 752, storage/memory 754, and communications circuitry 756 within each of ASR module 758, NLU module 760, applications module 762, and STT/TTS module 764 may differ. For example, the structure, function, and style of processor(s) 752 within ASR module 758 may be substantially similar to the structure, function, and style of processor(s) 752 within NLU module 760, however the actual processor(s) 752 need not be the same entity.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java, C, C# or C++ or any scripting language, such as Perl, Python or TCL, as well as combinations thereof. The server(s) may also include database servers, including without limitation those commercially available from Oracle, Microsoft, Sybase and IBM.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad, microphone, camera, etc.) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, sending and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A computing system, comprising:
a device processor;
a memory device including instructions that, when executed by the device processor, cause the computing system to:
  receive first audio input data from a voice-enabled communications device, the first audio input data corresponding to a first utterance of a user received by a microphone of the voice-enabled communications device;
  identify a first volume level of the first audio input data;
  identify a first search query from the first audio input data by performing automated speech recognition on the first audio input data;
  identify a set of categories associated with the first search query, the set of categories including two or more categories, each of the two or more categories being ranked according to respective relevance scores to the first search query;
  identify a first set of results associated with a first category of the set of categories, the first category having a largest relevance score to the first search query;
  cause the first set of results to be transmitted to the voice-enabled communications device, the first set of results being presented to the user of the voice-enabled communications device;
  receive second audio input data from the voice-enabled communications device, the second audio input data corresponding to a second utterance of the user received by the microphone of the voice-enabled communications device;
  identify a second volume level of the second audio input data;
  identify a second search query from the second audio input data by performing automated speech recognition on the second audio input data;
  determine that the first category is incorrect by:
    calculating a voice volume difference by comparing the first volume level and the second volume level; and
    determining whether the voice volume difference is above a volume difference threshold, the volume difference threshold indicating whether the volume level of the second utterance is at least a predetermined amount louder than the volume level of the first utterance;

decrease the relevance score of the first category for the first search query when the voice volume difference is determined to be above the volume difference threshold;

identify a second category of the set of categories associated with the first search query; and increase the relevance score of the second category for the first search query when the voice volume difference is determined to be below the volume difference threshold.

2. The computing system of claim 1, wherein the instructions, when executed further enable the computing system to:

determine that the second category has a second largest relevance score to the first search query;

identify a second set of results associated with the second category; and cause the second set of results to be transmitted to the voice-enabled communications device, the second set of results being presented to the user of the voice-enabled communications device.

3. The computing system of claim 1, wherein determining that the first category is incorrect further comprises:

determining the voice volume difference is above the volume difference threshold; or calculating a search query similarity score by comparing the first search query and the second search query; and determining the search query similarity score is above a similarity score threshold indicating that the second search query is a repeat search query of the first search query.

4. The computing system of claim 2, wherein the instructions, when executed further enable the computing system to:

receive third audio input data from the voice-enabled communications device, the third audio input data corresponding to a third utterance of the user received by the microphone of the voice-enabled communications device;

identify a third volume level of the third audio input data;

identify a third search query from the third audio input data by performing automated speech recognition on the third audio input data;

determine that the second category is correct by:

calculating a second voice volume difference by comparing the first volume level and the third volume level; and determining the second voice volume difference is below the volume difference threshold indicating that the volume level of the third utterance is not the predetermined amount louder than the volume level of the first utterance; and calculating a second search query similarity score by comparing the first search query and the third search query; and determining the second search query similarity score is below the similarity score threshold indicating that the third search query is different than the first search query; and increase the relevance score of the second category for the first search query.

5. A computing system, comprising:

a computing device processor;

a memory device including instructions that, when executed by the computing device processor, enable the computing system to:

receive a first search request, the first search request associated with first audio input data from a device;

identify a first search query from the first search request;

identify a set of categories associated with the first search query, the set of categories including two or more categories, each of the two or more categories being ranked according to respective relevance scores to the first search query;

identify a first set of results associated with a first category, the first category having a highest relevance score to the first search query;

cause the first set of results to be transmitted to the device, the first set of results being presented to the user of the device;

receive a second search request, the second search request associated with second audio input data from the device;

analyze the second search request for indicators that an incorrect category was presented;

determine the second search request includes one or more of the indicators that the incorrect category was presented;

decrease the relevance score of the first category for the first search query when a voice volume difference is determined to be above a volume difference threshold;

identify a second category of the set of categories associated with the first search query; and increase the relevance score of the second category for the first search query when the voice volume difference is determined to be below the volume difference threshold.

6. The computing system of claim 5, wherein the instructions, when executed further enable the computing system to:

identify a second category from the set of categories, the second category having a second highest relevance score to the first search query;

identify a second set of results associated with the second category; and cause the second set of results to be transmitted to the device, the second set of results being presented to the user of the device.

7. The computing system of claim 6, wherein the instructions, when executed further enable the computing system to:

receive a third search request, the third search request associated with third audio input data from the device;

analyze the third search request for the indicators that the incorrect category was presented;

determine the third search request does not include one or more indicators that the incorrect category was presented; and increase the relevance score of the second category for the first search query.

8. The computing system of claim 5, wherein analyzing the second search request for indicators that an incorrect category was presented further comprises:

identifying a first volume level of the first audio input data;

identifying a second volume level of the second audio input data;

calculating a voice volume difference by comparing the first volume level and the second volume level; and determining the voice volume difference is above a volume difference threshold.

9. The computing system of claim 5, wherein analyzing the second search request for indicators that an incorrect category was presented further comprises:
- identifying a second search query from the second search request;
- calculating a search query similarity score by comparing the first search query and the second search query; and
- determining the search query similarity score is above a similarity score threshold indicating that the second search query is a repeat search query of the first search query.

10. The computing system of claim 5, wherein the first search request and the second search request are received during a session between the user and the device.

11. The computing system of claim 10, wherein an end of the session is determined by an amount of time between the first set of results being presented to the user of the device and the receiving of the second search request.

12. The computing system of claim 10, wherein an end of the session is determined by an input of the user.

13. The computing system of claim 6, wherein identifying a set of categories associated with the first search query further comprises:
- obtaining the set of categories by searching one or more data stores of categories for the first search query, the one or more data stores of categories storing a plurality of categories associated with a plurality of search queries.

14. The computing system of claim 13, wherein identifying a first set of results associated with a first category further comprises:
- selecting the first category from the set of categories based at least in part on the relevance score of the first category to the first search query;
- obtaining a plurality of matching entities associated with the first search query by searching one or more data stores of content for entities matching the first search query and the first category, the plurality of matching entities being ranked according to a search similarity score to the first search query; and
- selecting a predetermined number of results sorted by the search similarity score to the first search query.

15. The computing system of claim 14, wherein searching the one or more data stores of content is further based at least in part on a geographic location of the device.

16. A method comprising:
- receiving a first search request, the first search request associated with first audio input data from a device;
- identifying a first search query from the first search request;
- identifying a set of categories associated with the first search query, the set of categories including two or more categories, each of the two or more categories being ranked according to respective relevance scores to the first search query;
- identifying a first set of results associated with a first category, the first category having a highest relevance score to the first search query;
- causing the first set of results to be transmitted to the device, the first set of results being presented to the user of the device;
- receiving a second search request, the second search request associated with second audio input data from the device;
- analyzing the second search request for indicators that an incorrect category was presented;
- determining the second search request includes one or more of the indicators that the incorrect category was presented; and
- decreasing the relevance score of the first category for the first search query when a voice volume difference is determined to be above a volume difference threshold;
- identifying a second category of the set of categories associated with the first search query; and
- increasing the relevance score of the second category for the first search query when the voice volume difference is determined to be below the volume difference threshold.

17. The method of claim 16, further comprising:
- identifying a second category from the set of categories, the second category having a second highest relevance score to the first search query;
- identifying a second set of results associated with the second category; and
- causing the second set of results to be transmitted to the device, the second set of results being presented to the user of the device.

18. The method of claim 16, wherein analyzing the second search request for indicators that an incorrect category was presented further comprises:
- identifying a first volume level of the first audio input data;
- identifying a second volume level of the second audio input data;
- calculating a voice volume difference by comparing the first volume level and the second volume level; and
- determining the voice volume difference is above a volume difference threshold.

19. The method of claim 16, wherein analyzing the second search request for indicators that an incorrect category was presented further comprises:
- identifying a second search query from the second search request;
- calculating a search query similarity score by comparing the first search query and the second search query; and
- determining the search query similarity score is above a similarity score threshold indicating that the second search query is a repeat search query of the first search query.

20. The method of claim 16, further comprising:
- receiving a third search request, the third search request associated with third audio input data from the device;
- analyzing the third search request for the indicators that the incorrect category was presented;
- determining the third search request does not include one or more indicators that the incorrect category was presented; and
- increasing the relevance score of the second category for the first search query.

* * * * *